United States Patent
Chen et al.

(10) Patent No.: US 9,321,975 B2
(45) Date of Patent: Apr. 26, 2016

(54) SYSTEM AND METHOD FOR COOLING SYNGAS WITHIN A GASIFIER SYSTEM

(71) Applicant: GENERAL ELECTRIC COMPANY, Schenectady, NY (US)

(72) Inventors: Lien-Yan Chen, Spring, TX (US); John Saunders Stevenson, Anaheim, CA (US); Jay Christopher Schleicher, Houston, TX (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 14/099,124

(22) Filed: Dec. 6, 2013

(65) Prior Publication Data
US 2015/0159098 A1 Jun. 11, 2015

(51) Int. Cl.
*C10J 3/86* (2006.01)
*F22B 1/18* (2006.01)
*C10J 3/48* (2006.01)
*C10J 3/72* (2006.01)

(52) U.S. Cl.
CPC .. *C10J 3/86* (2013.01); *C10J 3/485* (2013.01); *C10J 3/723* (2013.01); *F22B 1/1846* (2013.01)

(58) Field of Classification Search
CPC .................. C10J 3/86; C10J 3/30; F22B 1/18
See application file for complete search history.

(56) References Cited

U.S. PATENT DOCUMENTS

| | | | |
|---|---|---|---|
| 1,693,468 A * | 11/1928 | Schurmann | 220/226 |
| 4,202,672 A | 5/1980 | Schuurman | |
| 4,372,253 A | 2/1983 | Hibbel et al. | |
| 4,520,760 A | 6/1985 | Covell | |
| 4,535,727 A * | 8/1985 | Ziegler | 122/32 |
| 4,768,470 A * | 9/1988 | Ziegler | 122/7 R |
| 4,872,345 A | 10/1989 | Dicks | |
| 7,621,973 B2 | 11/2009 | Wallace | |
| 7,744,663 B2 | 6/2010 | Wallace | |
| 7,749,290 B2 | 7/2010 | Wallace | |
| 7,846,226 B2 | 12/2010 | Leininger et al. | |
| 8,006,983 B2 | 8/2011 | Russell et al. | |
| 8,038,747 B2 | 10/2011 | Wallace | |
| 8,197,564 B2 | 6/2012 | Jmenez-Huyke et al. | |
| 8,424,877 B2 | 4/2013 | Dinu et al. | |
| 2008/0041572 A1 | 2/2008 | Wessel et al. | |
| 2009/0025917 A1 | 1/2009 | Gauthier et al. | |
| 2010/0299915 A1 | 12/2010 | Storey et al. | |

* cited by examiner

Primary Examiner — Matthew Merkling
(74) Attorney, Agent, or Firm — Fletcher Yoder, P.C.

(57) ABSTRACT

A vessel for use in a gasification system is provided. The vessel includes a shell and a heat exchange structure positioned within the shell. The heat exchange structure defines a central cavity configured to receive and to direct a syngas to a quenching portion positioned downstream of the central cavity along a syngas path. A passageway is disposed between the shell and the heat exchange structure. A liquid seal is positioned upstream of the quenching portion, and the liquid seal is configured to block transport of at least one of the syngas between from the quenching portion into the passageway and inert gas from the passageway into the quenching portion.

11 Claims, 7 Drawing Sheets

US 9,321,975 B2

SYSTEM AND METHOD FOR COOLING SYNGAS WITHIN A GASIFIER SYSTEM

BACKGROUND

The subject matter disclosed herein relates generally to gasification systems, and, more particularly to systems and methods for cooling synthesis gas, or syngas.

Some gasification systems are used to generate a gas mixture of carbon monoxide (CO) and hydrogen ($H_2$), i.e., synthesis gas, or syngas, by reacting various hydrocarbon feedstock, such as coal, with oxygen and/or steam in a gasifier. The syngas may be processed and utilized in chemical applications or as fuel in a combined cycle power plant. The gasification process may generally take place at relatively high pressures and temperatures. Cooling the hot syngas may be desirable, for example, to aid in maintaining the stability of the syngas as the syngas is distributed for use in chemical applications or in combined cycle power plants. However, any mixing of fluids (e.g., liquids and/or gases) with the syngas may complicate downstream processing or use of the syngas.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a vessel for use in a gasification system is provided. The vessel includes a shell and a heat exchange structure positioned within the shell. The heat exchange structure defines a central cavity configured to receive and to direct a syngas to a quenching portion positioned downstream of the central cavity along a syngas path. A passageway is disposed between the shell and the heat exchange structure. A liquid seal is positioned upstream of the quenching portion, and the liquid seal is configured to block transport of at least one of the syngas from the quenching portion into the passageway and inert gas from the passageway into the quenching portion.

In another embodiment, a gasification system is provided. The gasification system includes a gasifier configured to produce a syngas and particulate matter and a syngas cooler coupled in flow communication with the gasifier and configured to receive the syngas and the particulate matter from the gasifier. The syngas cooler includes a shell and a heat exchange portion comprising a heat exchange structure positioned within a first region of the shell, wherein a passageway is disposed within the first region. The syngas cooler also includes a quenching portion disposed in a second region downstream of the heat exchange portion, wherein the quenching portion has a quench chamber configured to facilitate cooling at least one of the syngas and the particulate matter. A liquid seal is positioned between the first and second regions, and the liquid seal is configured to support a liquid across a gap between the first and second regions, and the liquid seal is configured to block at least one of the transport or diffusion of the syngas into the passageway or the transport or diffusion of an inert gas out of the passageway.

In another embodiment, a method of operating a vessel of a gasification system is provided. The method includes flowing a syngas through a cavity of the vessel toward a quenching portion and directing an inert gas into a passageway between the cavity and a shell of the vessel. The method further includes directing a liquid into a trough of a liquid seal positioned between the passageway and the quenching portion, wherein the liquid seal is configured to block the syngas from mixing with the inert gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
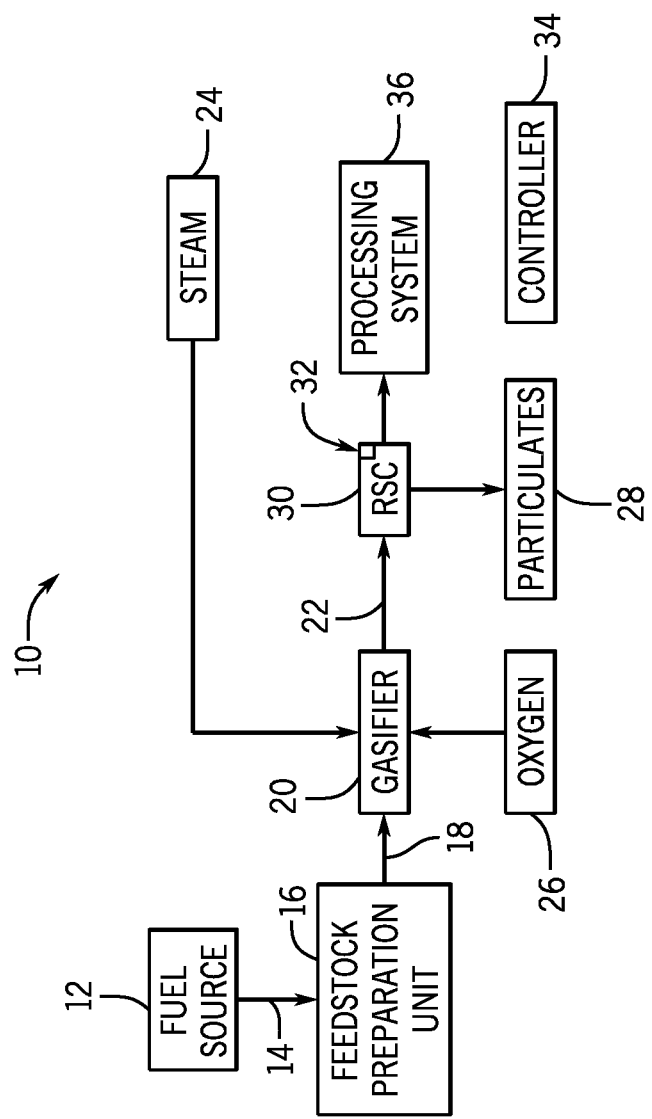
FIG. 1 is a schematic block diagram of an embodiment of a portion of a gasifier system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gasifier systems (e.g., gasification systems) in accordance with the present disclosure may include a gasifier configured to generate a synthesis gas, or syngas, and a syngas cooler configured to cool the syngas. The syngas cooler may utilize an inert gas, such as nitrogen, to maintain a pressure differential against the syngas in a hot path of the syngas cooler and/or to facilitate cooling of the syngas. In certain applications, particularly in certain chemical applications, it may be desirable to isolate the syngas from the inert gas within the syngas cooler, thereby reducing or eliminating any mixing of the inert gas with the syngas. Furthermore, it may be desirable to isolate certain portions of the syngas cooler from the syngas to mitigate the effects of corrosion.

Accordingly, the present disclosure relates generally to a seal (e.g., a sealing assembly or a sealing element) that may be configured to isolate the syngas from the inert gas within the syngas cooler. The seal may additionally or alternatively isolate and protect portions of a syngas cooler from exposure to corrosive syngas. As discussed in more detail below, in some embodiments, the seal may generally be positioned between a portion of the syngas cooler configured to receive and/or contain the inert gas and another portion of the syngas cooler configured to receive and/or contain the syngas. The seal may be a liquid seal (e.g., a water seal) that is configured to hold any liquid (e.g., water) suitable for blocking the transfer, such as by diffusion, of the inert gas and/or the syngas through the liquid and/or across (e.g., through) the seal, for example. In certain embodiments, the seal may be configured to enable overflow (e.g., flooding) of the liquid out of the seal, or otherwise discharge liquid from the seal, to help block diffusion of the inert gas and/or the syngas across the seal, to block any contaminants from accumulating in the seal, and/or to accommodate changes in pressure within the syngas cooler, as discussed in more detail below.

Additionally, syngas coolers may include one or more conduits that deliver a liquid coolant (e.g., water) to various heat exchange walls (e.g., heat exchange surfaces, interior walls, or tubes) and/or various other heat exchange elements (e.g., platen assemblies) within the syngas cooler. The heat exchange walls and/or elements may absorb heat from the syngas and generate steam, which is transported out of the syngas cooler. Such conduits in syngas coolers are positioned within a shell (e.g., an outer wall) of the syngas cooler. This positioning may make inspection, repair, and/or installation of the conduits difficult, especially with the incorporation of the seal into the syngas cooler, and/or may complicate the design of the seal and the conduits. Accordingly, there is a need to position the conduits in a manner that reduces the impact of the conduits on the design of the seal, and better enables access to the conduits accessible for inspection and repair. For example, in certain embodiments, at least a portion of the conduits may be positioned outside of the shell of the syngas cooler and may enter the syngas cooler (e.g., pass through the shell of the syngas cooler) near bottom headers of the heat exchange walls and/or elements to deliver the liquid coolant to these components. Such positioning may also facilitate operation of the syngas cooler coolant under conditions of natural convection.

FIG. 1 is a diagram of an embodiment of a portion of a gasifier system 10.

Elements of the system 10 may include a fuel source 12 configured to provide a fuel 14 that may be utilized as a source of energy for the system 10. The fuel 14 may include coal, petroleum coke, biomass, wood-based materials, agricultural wastes, tars, asphalt, or other carbon containing items, for example. The fuel 14 may be provided to a feedstock preparation unit 16. The feedstock preparation unit 16 may, for example, alter and/or prepare the fuel 14 by chopping, milling, shredding, pulverizing, grinding, thermally treating and/or slurrying the fuel 14 to generate feedstock 18.

The feedstock 18 may be passed to a gasifier 20 from the feedstock preparation unit 16. The gasifier 20 may convert the feedstock 18 into a syngas 22, which may include carbon monoxide (CO) and hydrogen ($H_2$). This conversion may be accomplished by subjecting the feedstock 18 to a controlled amount of steam 24 and oxygen 26 at elevated pressures (e.g., from approximately 20 bar to 85 bar or more) and temperatures (e.g., approximately 700 degrees Celsius-1600 degrees Celsius or more), depending on the type of gasifier 20 utilized. The gasifier 20 may also generate waste particulates 28, which may include dry ash and/or a wet ash material (e.g., slag).

In some embodiments, the gasifier 20 is configured to discharge the syngas 22, which may include particulates 28, into a syngas cooler 30, which may be a radiant syngas cooler (RSC), to facilitate cooling of the syngas 22. As discussed in more detail below, the syngas cooler 30 may include certain features, such as a seal 32, to limit contact between the syngas 22 and inert gases (not shown) utilized for maintaining a pressure differential across certain portions of the syngas cooler 30 and/or to mitigate corrosion of the syngas cooler 30 due to the syngas 22. Additionally, in some embodiments, at least a portion of certain conduits configured to deliver liquid coolant to heat exchange walls and/or elements of the syngas cooler 30 may be positioned outside of the syngas cooler 30 so as to facilitate inspection, repair, and/or installation of the conduits, and/or to provide sufficient space within the syngas cooler 30 for the seal 32, as discussed in more detail below.

In certain embodiments, the system 10 may include one or more controllers 34 that are generally configured to control one or more flows of the syngas 22, inert gases, and/or various liquids and/or liquid coolants within the syngas cooler 30. As discussed in more detail below, the controller 34 may be any suitable syngas cooler controller that is configured to send and/or to receive signals from the syngas cooler 30 and to control one or more flows within the syngas cooler 30. For example, and as discussed in more detail below, the controller 32 may control a flow of syngas 22 and/or inert gas based on pressures and/or pressure differentials within portions of the syngas cooler 30. Once cooled, the syngas 22 may be transmitted from the syngas cooler 30 to various processing systems (e.g., power-generating systems or chemical systems) 36. Syngas coolers 30 in accordance with the present disclosure may be particularly desirable for use with chemical processing systems 36, such as chemical processing systems 36 used to produce any of a variety of chemicals, such as methanol, ammonia, hydrogen, or acetic acid.

Figure 2:
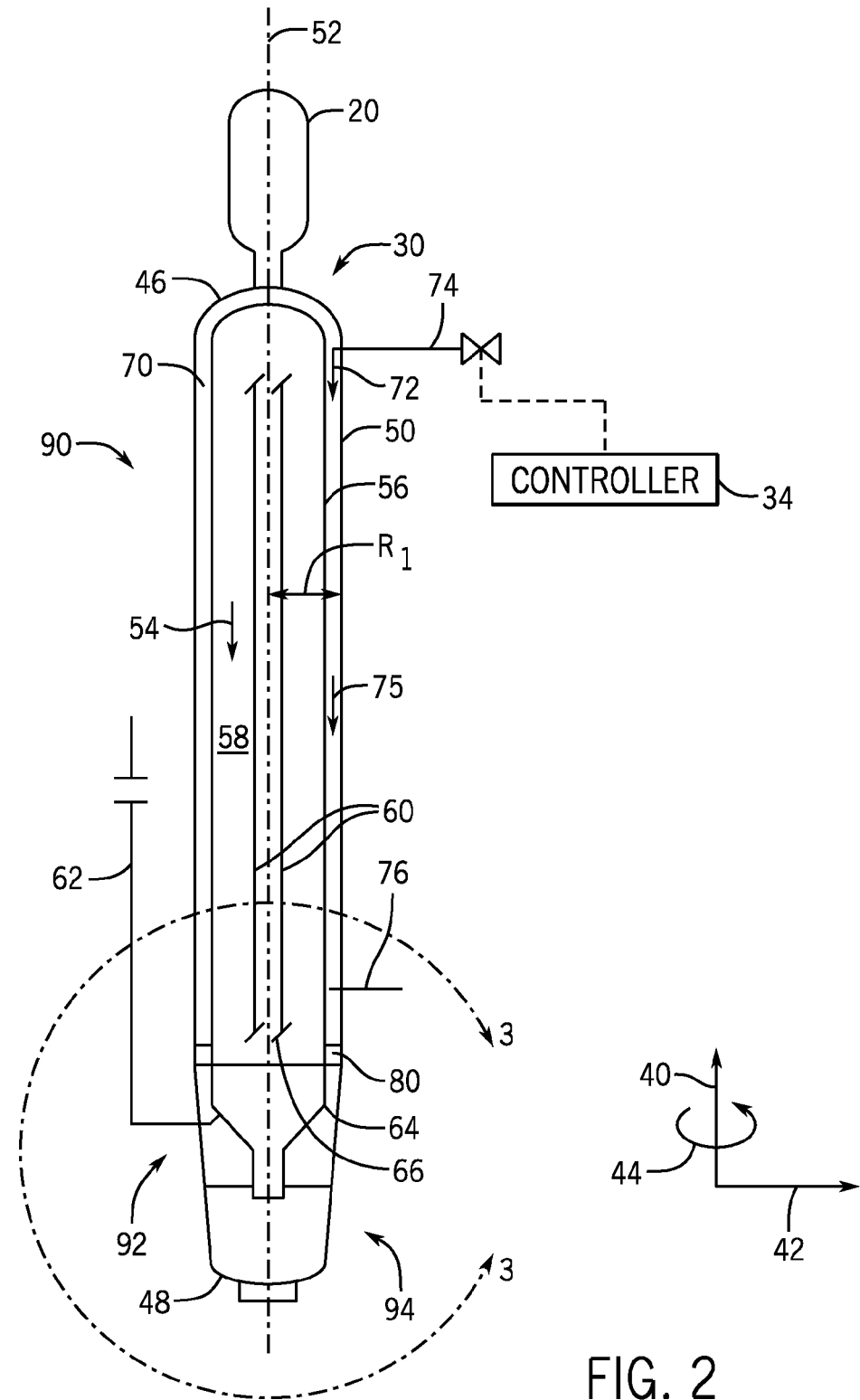
FIG. 2 is a cross-sectional view of an embodiment of a syngas cooler.

FIG. 2 is a cross-sectional view of an embodiment of the syngas cooler 30 that may be used with the gasification system 10 of FIG. 1. The syngas cooler 30 may be a radiant syngas cooler (RSC) and may have an axial axis 40, a radial axis 42, and a circumferential axis 44. Additionally, the syngas cooler 30 may have a first end 46 (e.g., a top end) and a second end 48 (e.g., a bottom end). As noted above, the syngas 22 generated in the gasifier 20 may include particulates 28 due to the gasification process, and the syngas 22 and/or the particulates 28 may be directed into the syngas cooler 30. The syngas cooler 30 may be configured to cool the syngas 22 prior to transmission of the syngas 22 from the syngas cooler 30 to the processing systems 36, where the syngas 22 may be utilized in various chemical processes or within a gas turbine engine, for example.

In certain embodiments, the syngas cooler 30 may include a shell 50 (e.g., outer wall) that is generally configured to provide pressure containment, as well as to protect and/or to support various components within the syngas cooler 30. The shell 50 may have a substantially circular cross-sectional shape with a centerline 52 (e.g., parallel to the axial axis 40) and a shell radius $R_1$, although any shape or form suitable for facilitating cooling of the syngas 22 may be utilized. The shell radius $R_1$, and any other radii disclosed herein are measured radially-outwardly 42 from the centerline 52, unless otherwise defined. Furthermore, the terms upstream and downstream are defined with respect to a main syngas flow path 54

(e.g., hot path), such that the top end 46 of the syngas cooler 30 is upstream from the bottom end 48 of the syngas cooler 30.

A heat exchange wall 56 (e.g., heat exchange structure, interior wall, membrane, or tube) may be positioned within the shell 50, and the heat exchange wall 56 may define a central cavity 58 (e.g., central portion) through which the syngas 22 flows along the main syngas flow path 54. In certain embodiments, the syngas cooler 30 may include additional heat exchange elements 60, such as one or more platen assemblies (e.g., about 1, 4, 8, 12, 16, 20, 24, 28, 32, or more), positioned within the central cavity 58 and configured to absorb heat from the syngas 22 as the syngas 22 flows along the main syngas flow path 54. In some embodiments, a liquid coolant (e.g., water) may be delivered via one or more conduits 62 to the heat exchange wall 56 and/or to the heat exchange elements 60 to facilitate cooling of the syngas 22 as the syngas 22 flows along the main syngas flow path 54. In some embodiments, the liquid coolant is delivered via the one or more conduits to a header 64 (e.g., a bottom header) of the heat exchange wall 56 and/or to a header 66 (e.g., a bottom header) of the heat exchange elements 60, as discussed in more detail below.

The heat exchange wall 56 may be configured to substantially isolate the shell 46 from the syngas 22 and/or particulates 28 flowing along the main syngas flow path 54. Additionally, in some embodiments, an annular passageway 70 may extend between or may be defined by the heat exchange wall 56 and the shell 50. An inert gas 72 (e.g., purge gas, non-reactive gas, or any species of gas that is non-reactive with the syngas 22 and/or compatible with the syngas cooler 30 materials, such as recycled $CO_2$), such as nitrogen, may be provided or delivered into the annular passageway 70 via a gas inlet 74 (e.g., the gas inlet 74 may be coupled to the annular passageway 70). The inert gas 72 may flow along an inert gas path 75 and may exit the annular passageway 70 via a gas outlet 76 (e.g., the gas outlet 76 may be coupled to the annular passageway 70) located downstream of the gas inlet 74. In some embodiments, the inert gas 72 may be utilized to maintain a pressure differential against the syngas 22 flowing along the main syngas flow path 54. Thus, a flow of the inert gas 72 into and/or out of the annular passageway 70 may be controlled by the controller 34, for example, based on a monitored pressure differential between the syngas 22 and the inert gas 72, as discussed in more detail below. Additionally, in some embodiments, a seal 80 may be provided to isolate the inert gas 72 from the syngas 22 and/or to limit diffusion (e.g., movement or flow) of the syngas 22 into the annular passageway 70 to protect the annular passageway 70 from the corrosive syngas 22. Thus, during operation, the inert gas 72 is on one side of the seal 80, while the syngas 22 is on the other side of the seal 80. In certain embodiments, the seal 80 may be positioned within the annular passageway 70, as shown in FIG. 2. Thus, the seal 80 may be annular in shape and surround the central cavity 58 and/or be positioned within the shell 50.

The heat exchange wall 56, the central cavity 58, and/or the heat exchange elements 60 may be part of or may define a first region 90 (e.g., an upper region or a heat exchange region) that is generally upstream of a second region 92 (e.g., a lower region or a quenching region) of the syngas cooler 30. Thus, the syngas 22 and/or particulates 28 may flow along the main syngas flow path 54 within the heat exchange region 90 toward the quenching region 92. The quenching region 92 may have a quench chamber 94 configured to cool the syngas 22, as discussed in more detail below. In some embodiments, various components of the syngas cooler 30, such as the shell 50, the heat exchange wall 56, and/or the heat exchange elements 60, may be fabricated from any suitable material configured to resist corrosion.

Figure 3:
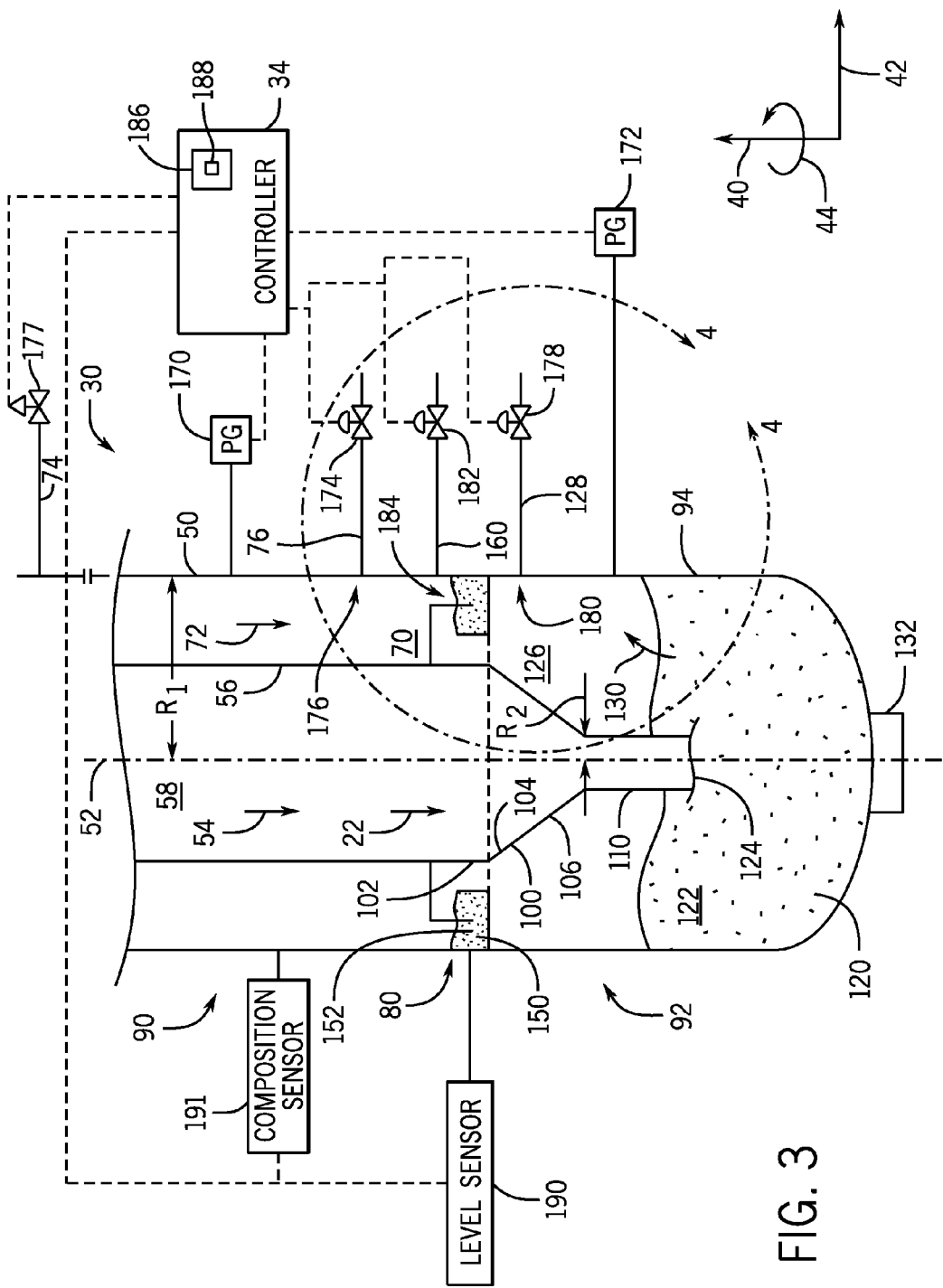
FIG. 3 is a cross-sectional view of an embodiment of a portion of the syngas cooler of FIG. 2, taken within line 3-3.

FIG. 3 illustrates a cross-sectional side view of an embodiment of a portion of the syngas cooler 30 of FIG. 2, taken within line 3-3. In certain embodiments, a lower wall 100 generally separates the heat exchange region 90 from the quenching region 92. The lower wall 100 may take any form suitable for facilitating cooling of the syngas 22 and/or for directing (e.g., channeling) the syngas 22 toward the quench chamber 94. In some embodiments, the lower wall 100 may extend from or may be coupled to an end 102 of the heat exchange wall 56. In certain embodiments, the lower wall 100 is substantially conical and tapers radially-inwardly 42 away from the shell 50, or converges from an upstream end 104 of the lower wall 100 to a downstream end 106 of the lower wall 100.

As shown, a dip tube 110 may extend from the downstream end 106 of the lower wall 100 toward the quench chamber 94. The dip tube 110 may also take any form suitable for facilitating cooling of the syngas 22 and/or for directing the syngas 22 toward the quench chamber 94. In some embodiments, the dip tube 110 has a generally circular cross-sectional shape with centerline 52 and a radius $R_2$, which may be smaller than $R_1$.

As indicated above, the quench chamber 94 may be generally configured to facilitate cooling of the syngas 22 and/or removal of particulates 28 from the syngas 22. As shown, the quench chamber 94 may include a bath 120 (e.g., a water bath) having a liquid coolant 122, such as water, although any suitable liquid (e.g., non-reactive liquid) for quenching the syngas 22 may be utilized. In some embodiments, a lower end 124 of the dip tube 110 may extend into the liquid coolant 122 to facilitate flow of the syngas into the liquid coolant 122. The syngas 22 may be cooled through contact with the liquid coolant 122, and the syngas 22 may then pass out of the liquid coolant 122 and through a volume 126 (e.g., a volume defined at least in part by the dip tube 110, the shell 50, and/or the seal 80) toward a syngas outlet 128, as shown by arrow 130. Although one syngas outlet 128 is shown, multiple syngas outlets 128 may be provided, in some embodiments. Additionally, the quench chamber 94 may facilitate scrubbing of the syngas 22 and heated liquid coolant 122 containing the scrubbed particulates 28 may be directed toward one or more coolant and/or particulate outlets, such as coolant/particulate outlet 132, where they are discharged.

As noted above, the inert gas 72 may be injected or directed into the annular passageway 70 to maintain the pressure differential against the syngas 22 flowing along the main syngas flow path 54. The inert gas 72 may be selected so as not to interact with (e.g., corrode) the materials used in the manufacture or construction of the syngas cooler 30. Certain embodiments of the syngas cooler 30 provided herein may include the seal 80, which may be configured to isolate the inert gas 72 from the syngas 22. Such isolation may mitigate contamination of the syngas 22 with the inert gas 72, as well as mitigate or reduce the amount of inert gas 72 utilized to achieve and/or to maintain the pressure differential, for example. Additionally or alternatively, the seal 80 may be configured to limit the diffusion of the syngas 22, particulates 28, and/or moisture into the annular passageway 70, thus mitigating the effects of corrosion due to the syngas 22.

In certain embodiments, the seal 80 may be a liquid seal (e.g., a water seal). In some embodiments, the seal 80 may be positioned within the annular passageway 70, although the seal 80 may be positioned in any suitable location within the syngas cooler 30 to provide a barrier between the syngas 22 in the quenching portion 92 and the inert gas 72 in the annular passageway 70. For example, the seal 80 may be positioned in any suitable location along the axial axis 40 between the quench chamber 94 and the annular passageway 70. The seal 80 may include a trough 150 (e.g., an annular trough) that is configured to support (e.g., hold) a liquid 152 (e.g., water). The liquid 152 may be provided to the seal 80 by a liquid inlet 160 (e.g., nozzle) positioned upstream of and/or adjacent to the trough 150. When there is a suitable pressure balance across the seal 80, the liquid 152 within the seal 80 may be held within the trough 150 and may block the inert gas 72 from passing into the quenching region 92 to mix with the syngas 22 and/or may block the syngas 22 from passing into the annular passageway 70. Desirably, the seal 80 may be configured to enable the passage of the inert gas 72 and/or the syngas 22 across the seal 80 when large pressure differentials occur (e.g., the liquid 152 may flow or be forced out of the trough 150 to facilitate a return to an appropriate pressure differential and/or to protect components of the syngas cooler 30 when the pressure differential exceeds a certain threshold). Thus, the seal 80 may be a dynamic sealing device that may adapt to changes in pressure within the syngas cooler 30 and may provide a fail-safe mechanism during periods of high pressure. In some such cases, an amount of the syngas 22 may be temporarily present in the annular passageway 70 and may mix with the inert gas 72 along the inert gas path 75 and/or the inert gas 72 may be temporarily present in the quenching portion 90 and may mix with the syngas 22 in the quenching portion 92, for example.

In some embodiments, one or more control systems having the controller 34 may be provided to adjust and/or to maintain appropriate pressure differentials within the syngas cooler 30. For example, as shown in FIG. 3, a first pressure sensor 170 may be provided to sense a first pressure within the annular passageway 70 (e.g., a pressure of the inert gas 72 within the annular passageway 70) and/or a second pressure sensor 172 may be provided to sense a second pressure within the quenching portion 92 (e.g., a pressure of the syngas 22 within the quenching portion 92) or within the central cavity 58. The signals from the first pressure sensor 170 and/or the second pressure sensor 172 may be provided to the controller 34. The controller 34 may include a processor and memory with instructions to process the signals and control (e.g., provide a signal to) one or more valves (e.g., control devices, control valves, pressure control valves, and/or flow control valves). For example, the controller 34 may control a pressure or flow control valve 174 that adjusts a flow 176 of the inert gas 72 out of the annular passageway 70 via the gas outlet 76 and/or a second pressure or flow control valve 178 that adjusts a flow 180 of the syngas 22 out of the quenching portion 92 via the syngas outlet 128 based at least in part on the received signals. In certain embodiments, the controller 34 may be configured to control a flow or level control valve 182 that adjusts flow 184 of the liquid 152 into the trough 150 of the seal 80 via the liquid inlet 160 based at least in part on the received signals. In certain embodiments, the controller 34 may be configured to control a pressure or flow control valve 177 that adjusts a flow of the inert gas 72 into the annular passageway 70 via the inlet 74 based at least in part on the received signals.

By way of example, if the pressure of the inert gas 72 within the passageway 70 exceeds the pressure of the syngas 22 within the quenching portion 92 or central portion 58 by more than a certain predetermined threshold (e.g., by more than 1%, 5%, 10%, or more), the controller 34 may control valve 174 to increase the flow 176 of the inert gas 72 out of the annular passageway 70, control valve 177 to decrease the flow of the inert gas 72 into the annular passageway 70, and/or may control valve 178 to decrease the flow 180 of the syngas 22 out of the quenching portion 92 to facilitate return to the appropriate pressure differential. Alternatively, if the pressure of the syngas 22 within the quenching portion 92 or central portion 58 exceeds the pressure of the inert gas 72 within the passageway 70 by more than the certain predetermined threshold (e.g., by more than 1%, 5%, 10%, or more), the controller 34 may control valve 178 to increase the flow 180 of the syngas 22 out of the quenching portion 92, control valve 174 to decrease the flow 176 of the inert gas 72 out of the annular passageway 70, and/or control the pressure control valve 177 to increase the flow of the inert gas 72 into the annular passageway 70 to facilitate return to the appropriate pressure differential.

Additionally or alternatively, a level sensor 190 may be provided to monitor a level of the liquid 152 within the trough 150. In such cases, a signal related to the level of the liquid 152 obtained by the level sensor 190 may be provided to the controller 34, which may be configured to control one or more of valves 174, 178, 182 based at least in part on the signal. For example, if the level of the liquid 152 is sensed to be below a certain predetermined threshold, the controller 34 may control valve 182 to increase a flow 184 of the liquid 152 into the trough 150 of the seal 80 via the liquid inlet 160. Additionally or alternatively, one or more level sensors 190 may be used to determine a pressure differential across seal 80, and thus be used to control valve 174, 177, 178, and/or 182.

As discussed above, in some embodiments, the seal 80 may be configured to enable the passage of the inert gas 72 and/or the syngas 22 across the seal 80 when large pressure differentials occur. In some such cases, the liquid 152 may flow or be forced out of the trough 150 to facilitate a return to an appropriate pressure differential and/or to protect components of the syngas cooler 30 when the pressure differential exceeds a certain threshold. Additionally, an amount of the syngas 22 may be temporarily present in the annular passageway 70 and may mix with the inert gas 72 along the inert gas path 75 and/or the inert gas 72 may be temporarily present in the quenching portion 90 and may mix with the syngas 22 in the quenching portion 92, for example. Accordingly, in some cases, a sensor 191 (e.g., a composition sensor) may be provided, such as in the annular passageway 70 or in the inert gas outlet 76, to monitor and/or to measure a composition of the inert gas 72 within the annular passageway 70 or exit gas flow 176, respectively. For example, if syngas 22 is detected in the annular passageway 72, the controller 34 may adjust the pressure or flow control valve 177 to increase a flow 74 of inert 72 into annular passageway 70 to decrease the concentration of syngas in the inert gas 72 in annular passageway 70. The extent of such an increase in flow 74 may be based on several factors, including but not limited to the concentration of syngas in the inert gas 72, the pressure in the annular space 70, and/or the differential pressure across heat exchange wall 56. Furthermore, such factors also may be used by controller 34 to adjust pressure or flow control valve 174 to either increase, maintain or decrease the exit gas flow 176 out of annular passageway 70. For example, by making similar adjustments in inlet flow 74 and exit flow 76, while seal 80 is engaged, the pressure in the annular space 70 and the differential pressure across heat exchange wall 56 may be maintained while speeding the removal of syngas 22 from the annular space 70. On the other hand, increasing the inlet flow 74 at a lesser rate than the exit flow 76, while seal 80 is engaged, will facilitate removal of syngas from the annular passageway 70, while also reducing the pressure in the annular passageway 70, and, depending on the differential pressure across heat exchange wall 56, either reducing or increasing the differential pressure across heat exchange wall 56.

In certain embodiments, the pressure sensors 170, 172 and/or the level sensor 190 may be configured to continuously monitor the pressure(s) and/or the liquid level. However, in other embodiments, one or more of the sensors 170, 172, 190 may be configured to periodically (e.g., every minute, hour, day, or more) check the pressure(s) and/or the liquid level and provide the corresponding signals to the controller 34, for example. Additionally, in certain embodiments, the seal 80 may release or may temporarily allow the exchange of the inert gas 72 and/or the syngas 22 across the seal 80 if a pressure imbalance (e.g., above a threshold) occurs across the seal 80, as set forth above.

As shown, the controller 34 may be configured to communicate with one or more sensors 170, 172, 190 and/or to control one or more valves 174, 178, 182. The one or more valves 174, 178, 182, in turn, affect or adjust the flow of the inert gas 72, the syngas 22, and/or the liquid 152. The various valves 174, 178, 182 may be positioned in any suitable arrangement and may be adjusted in any suitable manner to maintain the appropriate pressure differential and/or to facilitate operation of the seal 80. The controller 34 may include a distributed control system (DCS) or any computer-based workstation that is fully or partially automated. For example, the controller 34 may be any device employing a general purpose or an application-specific processor 186, both of which may generally include memory circuitry 188 for storing instructions related to pressure differentials and flow rates, for example. The processor 186 may include one or more processing devices, and the memory circuitry 188 may include one or more tangible, non-transitory, machine-readable media collectively storing instructions executable by the processor to perform the methods and control actions described herein. Such machine-readable media can be any available media that can be accessed by the processor or by any general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by the processor or by any general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause the processor or any general purpose computer, special purpose computer, or special purpose processing machines to perform a certain function or group of functions. As discussed below, the controller 34 may use information provided via input signals received from one or more sensors 170, 172, 190 to execute instructions or code contained on the machine-readable or computer-readable storage medium and generate one or more output signals to the various valves 174, 182, 178. For example, based on the execution of the instructions or code contained on the machine-readable or computer-readable storage medium of the controller 34, the output signals may be used to control the flow of the inert gas 72 into and/or out of the annular passageway 70.

FIGS. 4-7 provide various embodiments of the seal 80 that may be utilized with the syngas cooler 30, in accordance with the present disclosure. Although several embodiments are depicted, it should be understood that the embodiments presented herein are not intended to be limiting and that the seal 80 and the other components of the syngas cooler 30 may take any form suitable for isolating the inert gas 72 from the syngas 22, separating or isolating the annular passageway 70 from the quenching portion 92 and/or the quench chamber 94, limiting the passage or diffusion of the inert gas 72 out of the annular passageway 70 into the quenching portion 92 and/or quench chamber 94, and/or limiting the passage or diffusion of the syngas 22 into the annular passageway 70, for example.

Figure 4:
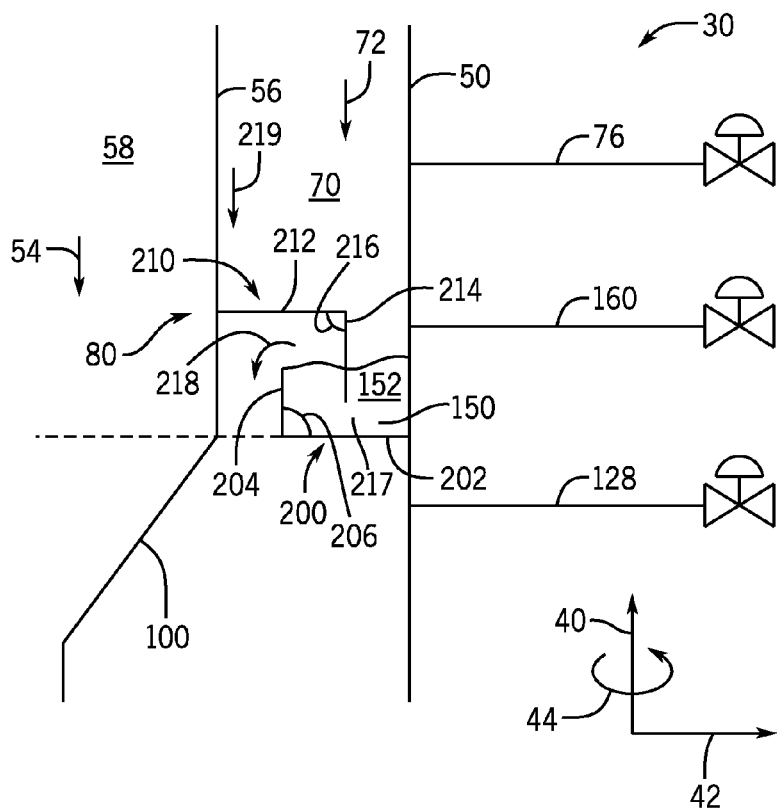
FIG. 4 is a partial cross-sectional view of an embodiment of a seal that may be utilized in the syngas cooler of FIG. 3, taken within line 4-4.

With the foregoing in mind, FIG. 4 illustrates an embodiment of the seal 80 that may be used in the syngas cooler 30. As shown, the trough 150 of the seal 80 may be formed by a first support 200 (e.g., a lower support) that is coupled to and extends radially-inwardly 42 from the shell 50. The first support 200 may include a first arm 202 (e.g., first portion or a bottom portion) and a lip 204. As shown, the first arm 202 and the lip 204 have a generally perpendicular orientation (e.g., an angle 206 may be approximately 90 degrees) with respect to one another, although any suitable orientation or angle 206 may be provided. The seal 80 may also include a second support 210 (e.g., an upper support) having a second arm 212 (e.g., second portion or a top portion) that extends radially-outwardly 42 toward the shell 50. The second arm 212 may be coupled to the heat exchange wall 56 and may extend into the annular passageway 70, although in other embodiments the second arm 212 may be coupled to the lower wall 100, for example. Regardless of its position along the axial axis 40, the second support 210 may include a protrusion 214. As shown, the second arm 212 and the protrusion 214 may have a generally perpendicular orientation (e.g., an angle 216 may be approximately 90 degrees) with respect to the top portion 212, although any suitable orientation or angle 216 may be provided. In the illustrated embodiment, the first support 200 and/or the second support 210 have a generally L-shaped cross-sectional shape (e.g., may be annular structures with the L-shaped cross-section), although any suitable cross-sectional shape may be provided. The first arm 202 and the second arm 212 may overlap along the radial axis 42, while the lip 204 and the protrusion 214 may overlap along the axial axis 40. Such a configuration forms the trough 150 that holds the liquid 152 and forms the seal 80, thereby blocking mixing of the syngas 22 and the inert gas 72. As shown, the seal 80 is configured to hold a liquid across a gap 217 (e.g., a space) between the first support 200 and the second support 210.

Additionally, in certain embodiments, the seal 80 may be configured to continuously flood (e.g., overflow over the lip portion 204 of the lower support 200) as shown by arrow 218. In such cases, consistent or continuous replenishment of the liquid 152 may help reduce build up of contaminants within seal 80. Continuously flooding the seal 80 may also help to limit diffusion of the syngas 22 through the liquid 152 and/or diffusion of the inert gas 72 through the liquid 152. In other embodiments, the liquid 152 in the seal 80 may be generally stagnant, and the seal 80 may be configured to periodically flood on a predetermined schedule (e.g., once per minute, hour, day, week, month, etc.) to remove or to flush any contaminants that may have built up in the liquid 152. The timing of the flushes may be performed by the controller 34. During overflow, the liquid 152 may pass into the quenching portion 90 and/or the quench chamber 94. In some embodiments, the liquid 152 and the liquid coolant 122 of the quench chamber 94 may be the same type of liquid (e.g., water), and thus mixing the liquid 152 with the liquid coolant 122 does not significantly change the composition of the liquid coolant 122.

In some embodiments, a configuration having the first support 200 extending from the shell 50 and the second support 210 extending from the heat exchange wall 56 or from the lower wall 100 may facilitate efficient manufacturing, assembly, and repair of certain portions of the syngas cooler 30. For example, the interior components, such as the heat exchange wall 56 with the coupled second support 212, may be easily placed within (e.g., inserted within or installed within) the shell 50 as shown by arrow 219 without disturbing the shell 50 or the first support 200.

Figure 5:
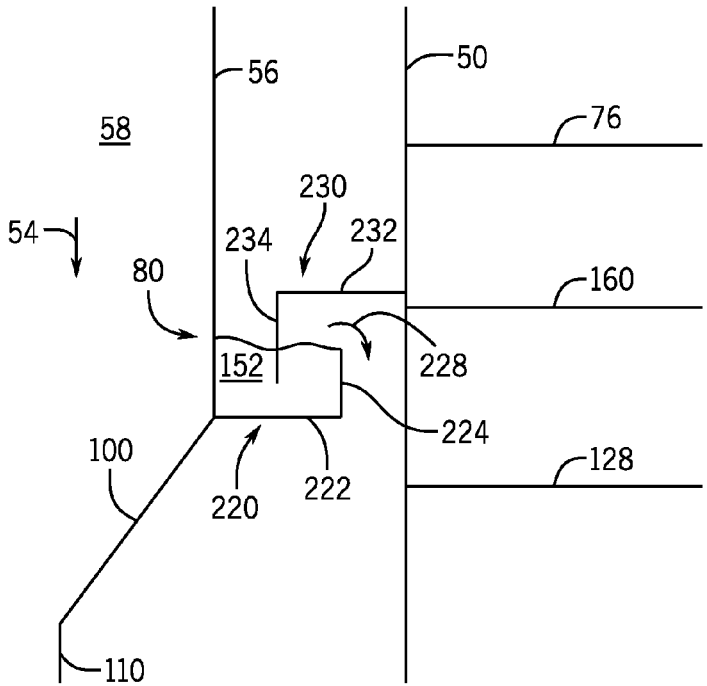
FIG. 5 is a partial cross-sectional view of an embodiment of a seal that may be utilized in a syngas cooler.

However, as noted above, the seal 80 may have any of a variety of configurations. For example, FIG. 5 illustrates another embodiment of the seal 80. Like the seal 80 of FIG. 4, the trough 150 is formed by a first support 220 (e.g., lower support) having a first arm 222 and a lip 224. However, in the depicted embodiment, the first arm 222 extends radially-outwardly 42 toward the shell 50. The first arm 222 may be coupled to any suitable portion of the syngas cooler 30, including the lower wall 100 or to the heat exchange wall 56, as shown. The seal 80 may include a second support 230 (e.g., upper support) having a second arm 232 and a protrusion 234. In the embodiment of FIG. 5, the second arm 232 extends radially-inwardly 42 away from the shell 50 and is coupled to the shell 50. The first support 220 and/or the second support 230 may generally have an L-shaped cross-sectional shape (e.g., may be annular structures with the L-shaped cross-section), although the supports 220, 230 may have any suitable cross-sectional shape or form, as discussed above. The first arm 222 and the second arm 232 may overlap along the radial axis 42, while the lip 224 and the protrusion 234 may overlap along the axial axis 40. If the seal 80 overflows, the liquid 152 may pass over the lip 224 as shown by arrow 228.

Figure 6:
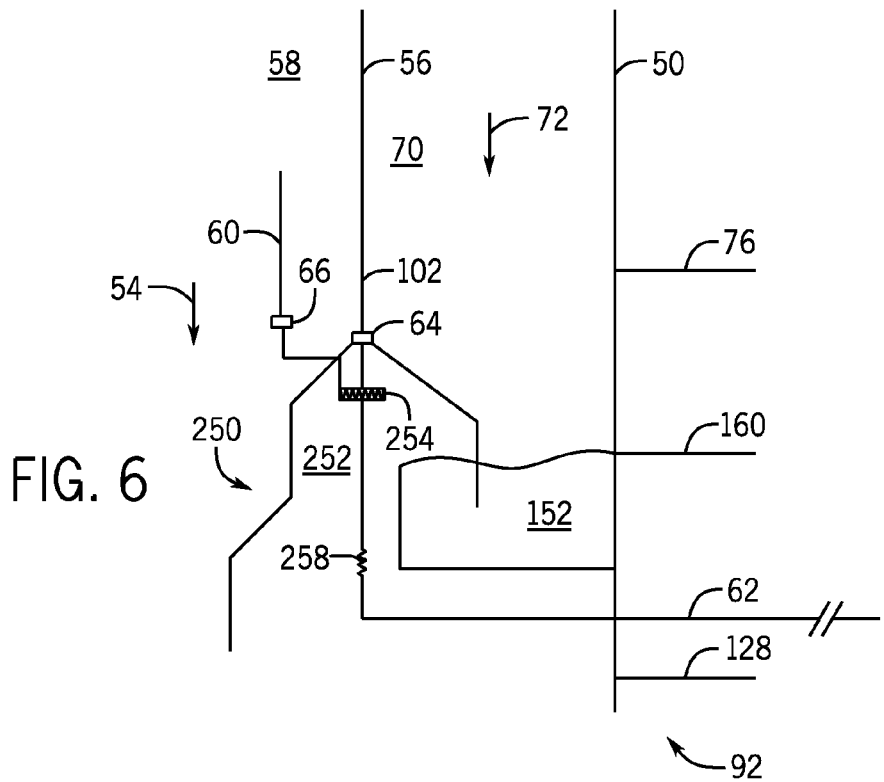
FIG. 6 is a partial cross-sectional view of an embodiment of a seal that may be utilized in a syngas cooler.

FIG. 6 illustrates another embodiment of the seal 80 having a stepped lower wall 250. Such a configuration may provide a volume 252 within the quenching portion 92 and/or downstream from the end 102 of the heat exchange wall 56 to facilitate routing the conduits 62 to deliver the liquid coolant to the heat exchange wall 56 and/or the heat exchange elements 60. Thus, as shown, the conduits 62 may be positioned outside of the annular passageway 70 and may pass through the shell 50 downstream of the seal 80 and may extend through the volume 252. In certain embodiments, each conduit 62 may distribute the liquid coolant to a header 254 (e.g., a branching header), which may in turn branch to one or more corresponding heat exchange wall headers 64 and/or to one or more corresponding heat exchange element headers 66. In other embodiments, each conduit 62 may pass through the shell 50 and extend directly to the heat exchange wall headers 64 and the heat exchange element headers 66. In some embodiments, an expansion joint 258 may be provided, such as adjacent (e.g., below) the branching header, to provide for thermal expansion.

Figure 7:
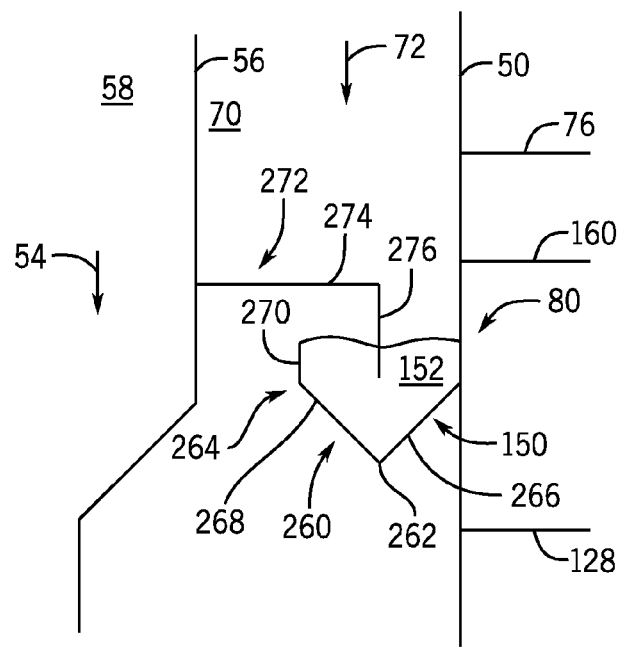
FIG. 7 is a partial cross-sectional view of an embodiment of a seal that may be utilized in a syngas cooler.

FIG. 7 illustrates another embodiment of the seal 80 having a drain 260 with one or more holes 262 (e.g., passageways or annular slot) configured to enable the liquid 152 and/or contaminants (e.g., any particulates 28 or other materials that accumulate within the trough 150) to drain or flow out of the trough 150. The drain 260 may take any suitable form and may generally be an annular structure (e.g., have an annular shape). As shown, the drain 260 be part of or may be formed by a first support 264 (e.g., lower support) having a first arm 266 and a second arm 268. The first arm 266 and/or the second arm 268 may be conical in shape and may taper inwardly toward each other, or converge from an upstream (e.g., first) end to a downstream (e.g., second) end of the drain 260. The first support 264 may also include a lip 270 configured to retain the liquid 152 within the trough 150. The seal 80 may include a second support 272 (e.g., upper support) having a first arm 274 and a protrusion 276.

The one or more holes 262 may be sized or configured so as not to affect the flooding of the seal 80, while purging or flushing out any contaminants. In certain embodiments, the drain 260 may be configured to drain liquid 152 and/or contaminants continuously. In other embodiments, the one or more holes 262 of the drain 260 may be adjustable, and thus may have a default closed position and may be controlled to open to an open position periodically (e.g., once per day, per week, per month, or year). Similarly, the one or more holes 262 may have a default open position and may be controlled to close to the closed position periodically based on the level of the liquid 152 as detected by the level sensor 190 or based on other factors. Additionally, in some such embodiments, the flow of the liquid 152 into the seal 80 may be controlled (e.g., by the controller 34) to flood the seal even as the liquid 152 drains through the one or more holes 262. In some embodiments, holes 262 may drain directly into the quench portion. In other embodiments, holes 262 may discharge external to syngas cooler 30.

Figure 8:
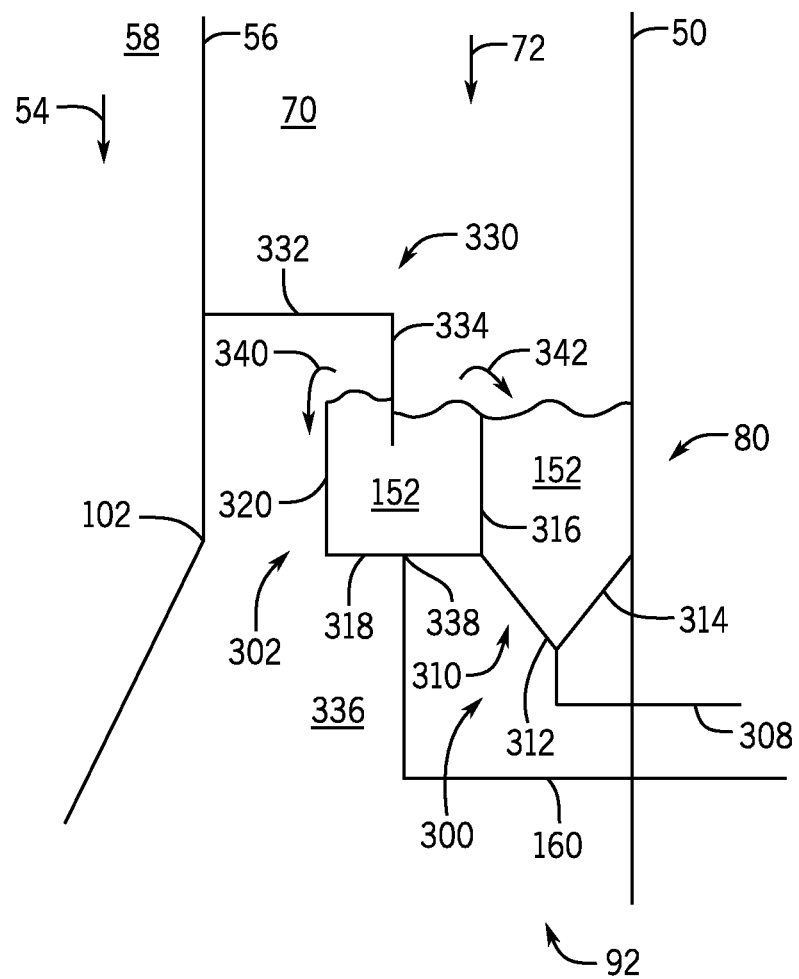
FIG. 8 is a partial cross-sectional view of an embodiment of a seal that may be utilized in a syngas cooler.

FIG. 8 illustrates another embodiment of the seal 80 having a first trough 300 and a second trough 302. The first trough 300 may be configured to enable the liquid 152 and/or contaminants (e.g., any particulates 28 or other materials that accumulate within the first trough 300) to drain or flow out of the first trough 300 through one or more drain outlets 308 provided to facilitate flow from the first trough 300.

The first trough 300 may take any suitable form and may generally be an annular structure (e.g., have an annular shape). As shown, the first trough 300 may be formed by a first support 310 that is coupled to and extends radially-inwardly 42 from the shell 50. The first support 310 may take any suitable shape or form. For example, the first support 310 may have a first arm 312 and a second arm 314 that are conical in shape and may taper inwardly toward each other, or converge from an upstream (e.g., first) end to a downstream (e.g., second) end of the first trough 300. In some embodiments, the first support 310 may also include a first lip 316 configured to retain the liquid 152 within the first trough 300.

In the illustrated embodiment, the first support 310 may also include a third arm 318 that extends radially-inwardly 42 from the shell 50 and from the first trough 300 and a second lip 320 that extends axially 40. As shown, the first lip 316 and the second lip 320 may be generally parallel with respect to each other, and in some embodiments, may be generally parallel to one or more of the shell 50 or the heat exchange wall 56. Furthermore, in some embodiments, the first lip 316 and the second lip 320 may be generally perpendicular or orthogonal to the third arm 318. Together, the first lip 316, the third arm 318, and the second lip 320 may form the second trough 302 and/or may be configured to support the liquid 152 within the second trough 302.

As shown, the seal 80 may include a second support 330 (e.g., upper support) that is coupled to and extends radially-outwardly 42 away from the heat exchange wall 56. The second support 330 may include a first arm 332 and a protrusion 334 and may generally have an L-shaped cross-sectional shape (e.g., may be annular structures with the L-shaped cross-section), although the second support 330 may have any suitable cross-sectional shape or form, as discussed above. The first arm 332 of the second support 330 and the third arm 318 of the first support 310 may overlap along the radial axis 42, while the protrusion 334 of the second support 330 may overlap with one or both of the first lip 316 or the second lip 320 of the first support 310 along the axial axis 40.

The fluid inlet 160 for providing the liquid 152 to the seal 80 may be provided in any suitable position. As shown, the fluid inlet 160 may be positioned within a volume 336 within the quenching portion 92 and/or downstream from the end 102 of the heat exchange wall 56 and/or downstream from the seal 80 to deliver the liquid 152 to the seal 80. In certain embodiments, the fluid inlet 160 may deliver the liquid 152 to the second trough 302, and the fluid inlet 160 may be configured to deliver the liquid 152 to the second trough 302 near a lower portion 338 of the second trough 302 of the seal 80. In some embodiments, the fluid inlet 160 may be configured to deliver the liquid 152 to the second trough 302 at approximately a midpoint (e.g., center point) of the second trough 302 (e.g., a midpoint between the first lip 316 and the second lip 320), thus facilitating overflow, discharge, and/or movement of the liquid 152 out of the second trough 302 as shown by arrows 340, 342.

In some embodiments, the seal 80 may be configured to continuously or periodically overflow, as shown by arrow 340. In certain embodiments, the seal 80 may be configured to maintain the flow 342 of the liquid 152 from the second trough 302 into the first trough 300, where the liquid 152 may be drained through the one or more drain outlets 308 of the first trough 300. Continuously flooding the seal 80 as shown in FIG. 8 may help reduce build-up of contaminants within seal 80. Continuously flooding the seal 80 of FIG. 8 may also help to limit diffusion of the syngas 22 through the liquid 152. Continuously flooding the seal 80 while draining the overflow into first trough 300 through drain outlets 308 may also help limit diffusion of the inert gas 72 through the liquid 152.

In certain embodiments, the flow of the liquid 152 into the seal 80 may be controlled (e.g., by the controller 34) to flood the seal 80 as the liquid drains through the one or more drain outlets 308. In some embodiments, the flow of the liquid 152 through the one or more drain outlets 308 may be controlled (e.g., by the controller 34) to maintain suitable levels of fluid 152 within the seal 80, for example.

Figure 9:
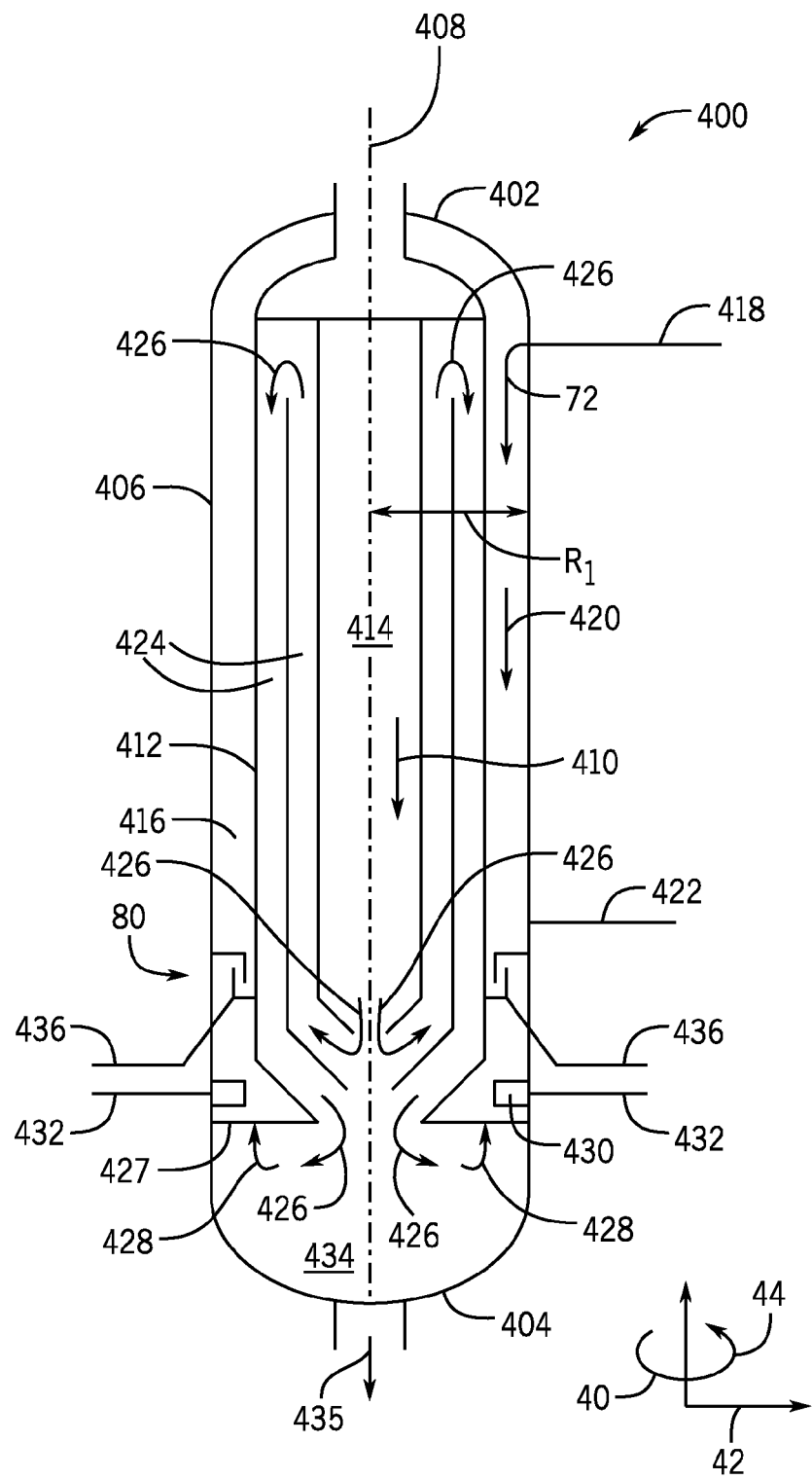
FIG. 9 is a partial cross-sectional view of an embodiment of a gasifier that includes a seal.

For purposes of discussion, the seal 80 is described in the context of the syngas cooler 30. However, the seal 80 disclosed herein may be adapted for use in other pressure vessels and/or in other components of a gasification system 10. For example, it may be desirable to include the seal 80 within gasifiers. For example, some gasifiers may be configured to actively cool the syngas 22 without passing the syngas 22 through a physically-separate syngas cooler, such as the syngas cooler 30. Some such gasifiers may include an integral or integrated syngas cooling system. Alternatively, some such gasifiers may incorporate a heat exchange wall similar to that shown as heat exchange wall 56 in FIG. 2 and FIG. 3 as part of a gasifier liner used to protect the gasifier vessel from the severe conditions occurring in the gasifier reactor. Accordingly, FIG. 9 illustrates a cross-sectional view of an embodiment of a gasifier 400 that may utilize the seal 80.

The gasifier 400 may generally have certain structural features similar to those described above with respect the syngas cooler 30 of FIG. 2, and thus, in some embodiments, the seal 80 may be adapted for use and/or may be positioned within the gasifier 400 in the same manner described above. As shown, the gasifier 400 may have the axial axis 40, the radial axis 42, and the circumferential axis 44. The gasifier 400 may include a first end 402 (e.g., a top end) and a second end 404 (e.g., a bottom end). The gasifier 400 may include a shell 406 (e.g., an outer wall) that is generally configured to provide pressure containment, as well as to protect and/or to support various components within the gasifier 400. The shell 406 may have a substantially circular cross-sectional shape with a centerline 408 (e.g., parallel to the axial axis 40) and a shell radius $R_1$, although any suitable shape or form may be utilized. Furthermore, as noted above, the terms upstream and downstream are defined with respect to a main syngas flow path 410 (e.g., hot path), such that the top end 402 of the gasifier 400 is upstream from the bottom end 404 of the gasifier 400.

A heat exchange wall 412, which may be a series of heat exchange walls or features, may be positioned within the shell 406. The heat exchange wall 412 may define a central cavity 414 through which the syngas 22 flows along the main syngas flow path 410. Additionally, in some embodiments, a first annular passageway 416 (e.g., an outer annular passageway) may be positioned between the heat exchange wall 412 and the shell 406. As discussed above with respect to the syngas cooler 30, the inert gas 72 such as nitrogen, may be provided or delivered into the annular passageway 416 via a gas inlet 418. The inert gas 72 may flow along an inert gas path 420 and may exit the annular passageway 416 via a gas outlet 422 located downstream of the gas inlet 418. Additionally, as noted above, the flow of the inert gas 72 may be controlled via the controller 34, for example. In some embodiments, various sensors and/or valves may be provided, and the controller 34 may control various valves as discussed above.

In some embodiments, one or more additional (e.g., a second, a third, a fourth, or more) annular passageways 424 may be provided within the gasifier 400, such as between the central cavity 414 and the first annular passageway 416, to facilitate cooling of the syngas 22 within the gasifier 400. In some such embodiments, the syngas 22 may flow from the central cavity 414 into and through the additional annular passageways 424 as shown by arrows 426. The syngas 22 may exit the additional annular passageways 424 and may pass through a plate 427 (e.g., a perforated plate) as shown by arrow 428 toward and a separator 430 (e.g., an entrainment separator, cyclonic separator, centrifugal separator, chevron separator, or impingement separator). The separator 430 may separate particulates 28, and the syngas 22 may pass through the syngas outlet 432. In some embodiments, the particulates 28 or matter other than syngas 22 may pass toward a chamber 434 (e.g., a quenching chamber or a quenching portion) proximate to the second end 404 of the gasifier 400. In some embodiments, the chamber 434 may include a bath, which may be similar to the bath 120 described above with respect to the syngas cooler 30 of FIG. 3, for example. The chamber 434 may be configured to facilitate transfer of the particulates out of the gasifier 400 and/or may quench and/or scrub the particulates 28 or other matter when exiting the gasifier 400 as shown by arrow 435. In other embodiments, the syngas 22 is discharged from quench portion 92 without quenching or after only partial quenching, such as by injecting cooled recycle syngas into syngas 22 upstream of syngas outlet 432.

In some embodiments, the seal 80 may provided to isolate the inert gas 72 from the syngas 22 in the gasifier 400. In certain embodiments, the seal 80 may be positioned within the first annular passageway 416. Thus, the seal 80 may be annular in shape and surround the central cavity 414 and/or be positioned within the shell 406. In some embodiments, the seal 80 may be positioned upstream of the chamber 434. The seal 80 may have any of the features described herein, including those described above with respect to FIGS. 4-8, for example. Additionally, in some embodiments, one or more vessels 430 (e.g., a duct, channel, downspout, or outlet) may be provided to collect and/or to divert any liquid 152 that overflows from the seal 80. Such vessels 430 may be configured to divert the liquid 152 from the entrainment separator within the gasifier 400. In some embodiments, the vessels 430 may be coupled to the trough, such as the trough 150 of the seal 80 in FIG. 4. The gasifier 400 may include any additional features as described in U.S. Pat. No. 7,744,663, issued Jun. 29, 2010, entitled "Methods and Systems for Advanced Gasifier Solids Removal," U.S. Pat. No. 7,749,290, issued Jul. 6, 2010, entitled "Methods and Apparatus to Facilitate Cooling Syngas in a Gasifier," U.S. Pat. No. 7,621,973, issued Nov. 24, 2009, entitled "Methods and Systems for Partial Moderator Bypass," and U.S. Pat. No. 8,038,747, issued Oct. 18, 2011, entitled "Methods and Systems for Partial Moderator Bypass," all of which are herein incorporated by reference in their entirety for all purposes.

As indicated above, syngas coolers 30 may cool the syngas 22 and/or remove particulates 28 from the syngas 22. Syngas coolers 30 also may utilize an inert gas 72, such as nitrogen, to maintain the pressure differential against the syngas 22 within the syngas cooler 30. In certain designs, syngas coolers permit the inert gas 72 to mix with the syngas 22 and/or expose various portions of the syngas cooler 30, such as the annular passageway 70, to the corrosive syngas 22. However, in contrast to these designs, it may be desirable to cool syngas 22 without mixing the inert gas 72 with the syngas 22 and/or mitigate the effects of the corrosive syngas 22. Accordingly, the present disclosure sets forth the seal 80 that is generally configured to protect portions of the syngas cooler 30, such as the annular passageway 70, from exposure to corrosive syngas 22 and to additionally or alternatively isolate the syngas 22 from the inert gas 72. In some embodiments, the seal 80 may be a liquid seal that is able to adapt to changes in pressure differential within the syngas cooler 30, as well as to adapt to and tolerate thermal expansion. In certain embodiments, the seal 80 may be configured to facilitate overflow (e.g., flooding) of the liquid 152 out of the seal 80 to maintain appropriate pressure differential, to block any contaminants from accumulating in the liquid 152 in the seal 80, and/or to accommodate changes in pressure within the syngas cooler 30.

Additionally, as noted above, syngas coolers 30 may include one or more conduits 62 that deliver liquid coolant to various heat exchange walls 56 and/or heat exchange elements 60 within the syngas cooler 30. The heat exchange walls 56 and/or elements 60 may absorb heat from the syngas 22 and generate steam, which is transported out of the syngas cooler 30. In certain designs, such conduits 62 in the syngas cooler are positioned within the shell 50 of the syngas cooler 30. However, such positioning may interfere with the design and functioning of the seal 80, may make inspection, repair, and/or installation of the conduits 62 difficult, and may limit the ability to achieve natural circulation of the liquid coolant with the heat exchange walls 56. Thus, the present disclosure sets forth embodiments of the syngas cooler 30 having at least portions of the conduits 62 positioned outside of the shell 50 of the syngas cooler 30, to make the conduits 62 accessible for inspection and repair. Such positioning also may provide sufficient space or volume for placement of the seal 80 within the annular passageway 70. Technical effects of the invention include the ability to use the syngas cooler 30 to cool the syngas 22 without mixing the inert gas 72 with the syngas 22, while also mitigating the corrosive effects of the syngas 22 in certain portions of the syngas cooler 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gasification system, comprising:
   a gasifier configured to produce a syngas and particulate matter; and
   a syngas cooler coupled in flow communication with the gasifier and configured to receive the syngas and the particulate matter from the gasifier, the syngas cooler comprising:
   a shell;
   a heat exchange portion comprising a heat exchange structure positioned within a first region of the shell, wherein a passageway is disposed within the first region;
   a quenching portion disposed in a second region downstream of the heat exchange portion, wherein the quenching portion has a quench chamber configured to facilitate cooling at least one of the syngas or the particulate matter; and
   a liquid seal positioned between the first and second regions, wherein the liquid seal is configured to support a liquid across a gap between the first and second regions, and the liquid seal is configured to block at least one of transport or diffusion of the syngas into the passageway or transport or diffusion of an inert gas out of the passageway.

2. The system of claim 1, comprising an inert gas inlet configured to provide the inert gas into the passageway and an inert gas outlet configured to enable flow of the inert gas out of the passageway, wherein the inert gas outlet is located downstream of the inert gas inlet.

3. The system of claim 1, comprising one or more sensors configured to monitor a first pressure within the passageway, a second pressure within at least one of the quenching portion or a syngas path through the heat exchange structure, a level of the liquid within the liquid seal, or a composition of the inert gas within at least one of the passageway or the inert gas outlet.

4. The system of claim 3, comprising an inert gas inlet configured to enable a flow of inert gas into the passageway or an inert gas outlet configured to enable the flow of the inert gas out of the passageway, wherein the flow of the inert gas into or out of the passageway is controlled by a controller based on at least one of a pressure differential across the seal, a level differential across the seal, or the composition of the inert gas within at least one of the passageway or the inert gas outlet.

5. The system of claim 1, wherein the liquid seal comprises a trough configured to continuously overflow with the liquid.

6. The system of claim 1, wherein the liquid seal is configured to enable movement of the syngas into the passageway or the inert gas out of the passageway when a pressure differential across the liquid seal exceeds a predetermined threshold.

7. The system of claim 1, wherein the liquid seal comprises a first support extending from the shell and a second support extending from the heat exchange structure, and the first support and the second support form the gap.

8. The system of claim 7, wherein the first support and the second support overlap along an axial axis of the syngas cooler and along a radial axis of the syngas cooler.

9. The system of claim 1, wherein the liquid seal comprises a trough configured to support the liquid, and wherein the trough includes a drain having one or more holes configured to drain the liquid out of the trough.

10. The system of claim 1, comprising one or more conduits configured to provide a cooling liquid to the heat exchange structure, wherein the one or more conduits are positioned outside of the passageway.

11. The system of claim 1, wherein the liquid seal comprises an annular liquid seal that extends circumferentially about the heat exchange structure.

* * * * *